April 1, 1958 — HO CHOW — 2,828,984
LINKAGE JOINTS
Filed March 16, 1955 — 2 Sheets-Sheet 1

INVENTOR
Ho Chow

April 1, 1958 HO CHOW 2,828,984
LINKAGE JOINTS
Filed March 16, 1955 2 Sheets-Sheet 2
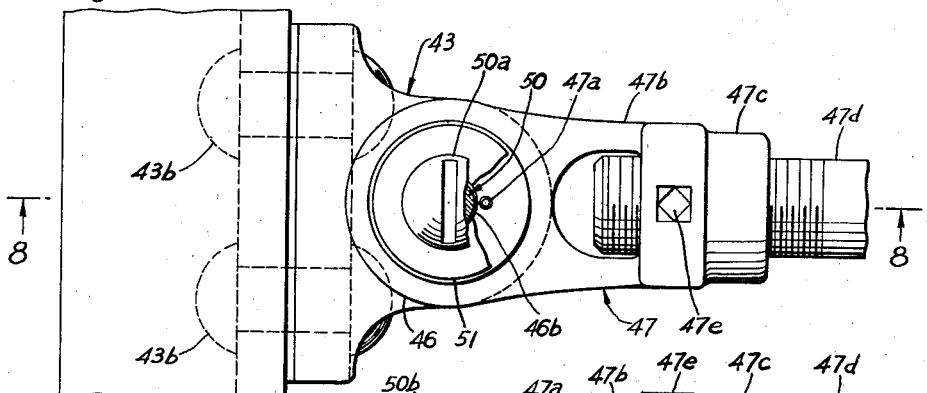
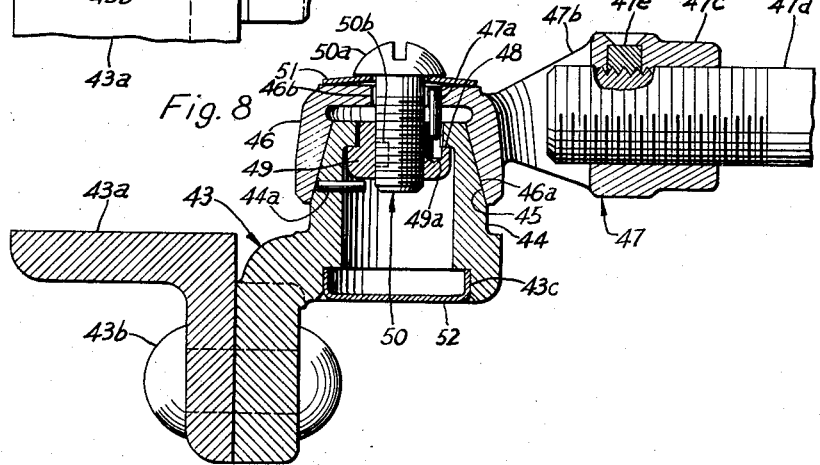
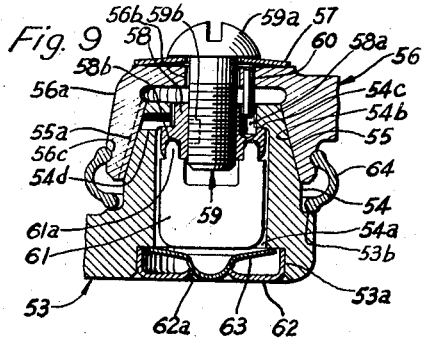
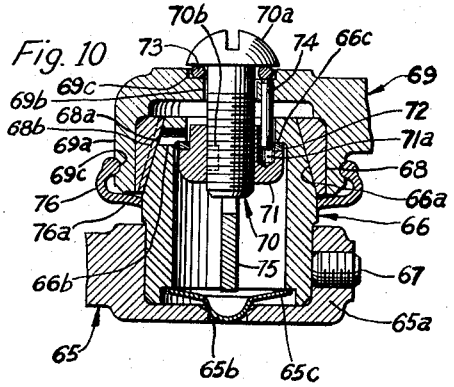
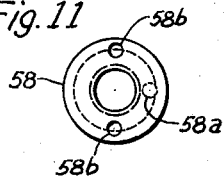
INVENTOR,
Ho Chow United States Patent Office 2,828,984
Patented Apr. 1, 1958

2,828,984

LINKAGE JOINTS

Ho Chow, New York, N. Y.

Application March 16, 1955, Serial No. 494,758

8 Claims. (Cl. 287—90)

This invention relates to an improved linkage joint and one of its objects is to provide a linkage joint with a hollow stud as a part of a male link end member, a bearing socket as a part of a female link end member which can rotate and tilt on the hollow stud, and a coupling bolt, which holds together the male and female link end members, being under pure tensile stress as induced by the load imposed on the link end members.

Another object of this invention is to provide a linkage joint with a hollow stud as a part of a male link end member, a bearing socket as a part of a female link end member which can only rotate on the hollow stud, and a coupling bolt, which fastens the male and female link end members, being under pure tensile stress as induced by the load imposed on the link end members.

Specially, the invention deals with a complete and compact linkage joint of greater in strength and lighter in weight applicable to all linkages or link mechanisms which are being used widely in the automotive, aircraft, machinery, instrument and other industries.

According to this invention, a male link end member has a hollow stud disposed laterally thereof formed with an external segmental spherical bearing surface and an internal segmental spherical bearing surface concentric therewith and both bearing surfaces may be hardened or plated with hard material, and a female link end member formed with a socket has an internal spherical bearing surface, which may be plated or lined with a thin layer of wearable bearing material, to receive the hollow stud and carries a coupling pin which extends through the hollow stud and a central hole in the socket and is formed with an integral segmental spherical head, which may be plated or lined with a thin layer of wearable bearing material, in mating with the internal spherical bearing surface of the hollow stud, the coupling pin is equipped with a nut threaded thereon against the outer face of the female link end member, whereby a full rotative and limited tilting movement betwen the link end members may be obtained and a proper clearance between bearing surfaces may be maintained and wear between the bearing surfaces of the linkage joint may be compensated by means of adjusting the nut on the coupling pin.

According to this invention, a male link end member has a hollow stud disposed laterally thereof formed with an external conical bearing surface and an internal plane bearing surface disposed in right angle to the axis of the external conical surface and both bearing surfaces may be hardened or plated with a thin layer of hard material, and a female link end member formed with a socket has an internal conical bearing surface, which may be plated or lined with a thin layer of wearable bearing material, to receive the hollow stud and carries a coupling pin which extends through a central hole of the socket and the hollow stud and has a flat head against the outer face of the female link end member, and the coupling pin is equipped with a nut threaded thereon in mating with the internal plane bearing surface of the hollow stud, while the bearing surface on the nut may be plated or lined with a thin layer of wearable bearing material, whereby a full rotative movement between the link end members may be obtained and a proper clearance between bearing surfaces may be maintained and wear between the bearing surfaces of the linkage joint may be compensated by means of turning of the coupling pin in the nut.

Another object of this invention is the provision of a linkage joint having two bearing rings disposed between the socket of the female link end member and the external bearing surface of the hollow stud and between the internal bearing surface of the hollow stud and the inner part of the coupling bolt, which may be replaced as wear is developed, to increase the service life and reduce the bearing friction of the linkage joint.

Another object of this invention is to provide a linkage joint having a compression spring, a disc spring, or an elastic washer located between the outer part of the coupling bolt and the adjacent outer face of the female link end member through which the coupling bolt extends, which will maintain pressure contact between the engaged bearing surfaces to eliminate noise between the link end members caused by vibration and the ultimate deflection of the spring by applying load on the link end members will provide a proper clearance between the engaged bearing surfaces.

A further object of the invention is the provision of means for keying the inner part of the coupling bolt to the female link end member so that the inner part of the coupling bolt which has the bearing surface in mating with the internal bearing surface of the hollow stud will always rotate with the female link end member and the adjustment of the bearing clearance could be done by means of only turning the outer part of the coupling bolt, either the head of the coupling pin or the nut.

A further object of this invention is the construction of the male link end member whose hollow stud can be inserted and secured in a socket of the male link end member so that the hollow stud could be replaced and made from material different to the male link end member.

A still further object of the invention is the provision of a linkage joint of these types with a lubricant reservoir inside the hollow stud for storing lubricant to lubricate the bearing surface to minimize wear and bearing friction, means carried by the inner part of the coupling bolt, inside the hollow stud, for stirring and circulating lubricant into the bearing surfaces, a spring valve for closing a filler opening of the reservoir, and a seal between the male and female link end members to retain lubricant and exclude dust getting into the bearing surfaces.

With the above and other objects in view the invention comprises certain new and useful constructions, combinations and arrangements of parts, clearly described in the following specification and fully illustrated in the drawings, in which:

Fig. 7 is a plan view of an embodiment of the linkage joint according to this invention, shown partly broken away.

Fig. 8 is a cross-sectional view thereof, taken on the line 8—8 of Fig. 7, looking in the direction of the arrows.

Fig. 9 is a cross-sectional view of a slightly modified form of the embodiment of the linkage joint of this invention.

Fig. 10 is a cross-sectional view of another modified form of the embodiment of the linkage joint of the present invention.

Fig. 11 is a detail bottom view of the nut, shown in Figs. 9 and 10.

Figure 1:
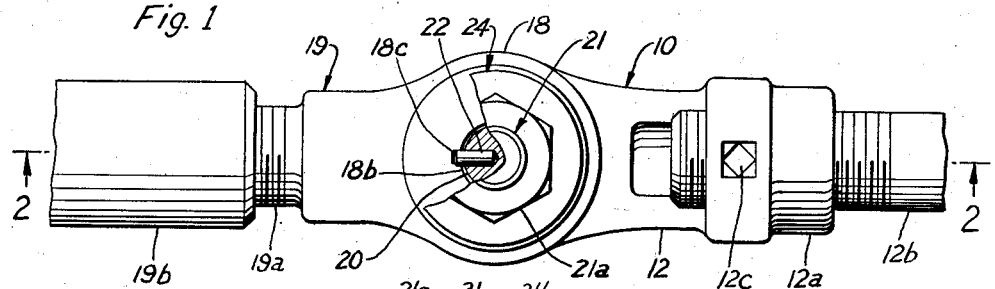
Fig. 1 is a plan view of a linkage joint according to this invention, shown partly broken away.
Figure 2:
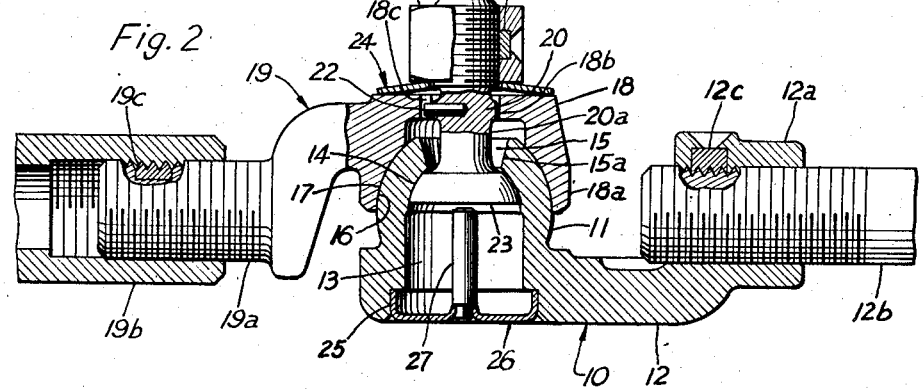
Fig. 2 is a cross-sectional view thereof, taken on the line 2—2 of Fig. 1, looking in the direction of the arrows.
Figure 4:
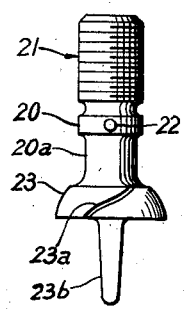
Fig. 4 is a detail side view of the coupling pin with head and blade as shown in Fig. 3.

In the drawing, Figs. 1 and 2 show a linkage joint constructed with a male link end member 10, having a hollow stud 11 formed integral with the link arm 12 thereof. The hollow stud 11 is formed hollow to provide an axial bore 13 and an internal segmental spherical bearing surface 14 concentric to an end hole 15 thereof. This hollow stud is further formed with an external segmental spherical bearing surface 16, which is concentric to the internal spherical bearing surface 14. The bounding edge 15a of the end hole 15 is tapered outwardly.

The external segmental spherical bearing surface 16 is engaged by an internal segmental spherical bearing surface 17 of a socket 18, which is formed integral with a female link end member 19, which is formed with a threaded shank 19a.

The socket 18 is formed with a skirt 18a having a hole 18b concentric with the socket, through which a shank 20 of a coupling pin 21 extends, and this shank is partly reduced in diameter to engage with the end hole 15 of the hollow stud when tilting, and the outer end of the coupling pin 21 is threaded externally to receive a nut 21a which is threaded thereon. The wall of the hole 18b is formed with a key slot 18c, and a key or pin 22 is driven into the shank 20, and this key has a free sliding fit in the slot 18c and keys the coupling pin to the female link end member to prevent relative rotative movement but to permit free sliding between these two parts, while the shank 20 itself has a sufficient clearance in the hole 18b.

The shank 20 of the coupling pin 21 at its reduced portion 20a has a limited tilting movement in the conical end hole 15 of the hollow stud 11, and this tilting movement is limited by the conical end hole and the relative diameter of the reduced shank portion therein.

The inner end of the coupling pin 21 is formed with a segmental spherical bearing head 23, which has a mating fit against the internal spherical bearing surface 14 of the hollow stud 11. A concavo-convex disc spring 24 is disposed on the coupling pin between the nut 21a and the outer face of the female link end member 19, and by adjusting the nut the pressure of engagement between the spherical head 23 and the internal spherical bearing surface 14 and between the external spherical bearing surface 16 and the internal spherical bearing surface 17 may be varied, while the compression disc or other spring disposed permits a relative yielding to prevent the binding of the engaged parts of the linkage joint.

The nut 21a is turned on the coupling pin 21 so that a specified clearance will be left under the disc spring 24, whereby when the link end members are loaded, the disc spring will become flat or is ultimately deflected and the corresponding bearing clearance between the external bearing surface 16 and the internal spherical bearing surface 17 will be formed and maintained with a resultant displacement in a direction normal to the axis of the coupling pin 21, while the hole 18b is so large that the shank 20 to the coupling pin 21 will never touch the wall of the hole 18b.

The bore 13 of the hollow stud 11 is enlarged to form an annular recess 25 into which a retaining cup 26 is forced. This cup carries a central stop pin 27, which projects toward the center of the spherical head 23 of the coupling pin 21, but is slightly spaced from it, to aid in maintaining the position of the coupling pin in the hollow stud for quick assembling of the female link end member, the disc spring and the nut.

The link arm 12 is formed with an integral offset tubular shank 12a, which is internally threaded and an externally threaded link rod 12b is threaded therein. The externally threaded shank 19a of the female link end member 19 is screwed in a tubular link rod 19b.

The nut 21a is provided with a plastic or other deformable insert 21b, to lock the same against accidental turning, and the tubular shank 12a is provided with a similar insert 12c for the purpose of locking the threaded link rod 12b against accidental turning. The threaded shank 19a is also provided with an insert 19c to prevent accidental turning of the tubular link rod 19b.

In this construction, the female link end member has a rotating and tilting movement on the hollow stud of the male link end member, and the load imposed on the link end members will induce a pure tensile stress in the shank of the coupling pin.

In Figs. 3, 4, 5 and 6, I show two modified forms of this invention, wherein similar parts are modified for provision of lubrication. For this purpose the spherical head 23 of the coupling pin is formed with a spiral lubrication groove 23a, and the internal spherical bearing surface 17 of the socket 18 of the female link end member 19 is formed with a spiral lubrication groove 17a. The retaining cup 26, shown in Fig. 2, is replaced by a cupped disc 26a, shown in Fig. 3, which is provided with a central filler opening 26b which is closed by means of a spring valve 28, having an extruded central semi-ball 28a, which closes the filler opening 26b. The head 23 of the coupling pin is formed with an integral fin or blade 23b which stirs and circulates the lubricant disposed in the axial bore 13 of the hollow stud 11.

Leakage of lubricant from this linkage joint is effectively prevented by means of an elastic corrugated sleeve 29, which has a beaded ring 29a which is forced on the skirt 18a of the socket 18, the latter being formed with a receiving groove 18d for this purpose. The other beaded ring 29b of this shielding sleeve 29 is engaged with an outer shoulder 11a of the hollow stud 11. A lubricant hole or passage 11b is formed through the wall of this hollow stud to allow the lubricant to flow into the engaged outer spherical bearing surface.

Figure 6:
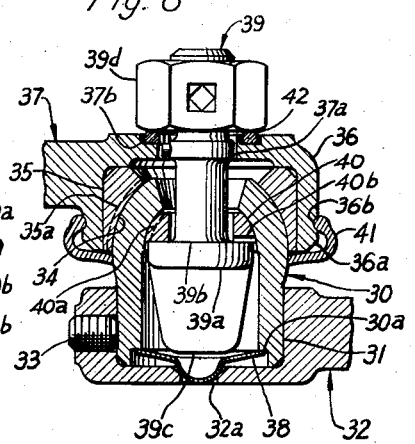
Fig. 6 is a cross-sectional view of another modified form of the linkage joint of the present invention.

In Fig. 6, a hollow stud 30 is shown to be tightly fitted in a cylindrical socket 31 of a male link end member 32, and is secured in place as by a set screw 33, threaded through the wall of the socket 31 against the shank of the hollow stud 30.

The external spherical bearing surface 34 of the hollow stud is engaged by a replaceable bearing ring 35, which has an internal segmental spherical bearing surface engaged therewith, and is provided with a spiral lubrication groove 35a, and this bearing ring is force fitted in a cylindrical socket 36 of a female link end member 37. The bore of the hollow stud 30 is provided with a shoulder 30a which is engaged by a spring valve 38, which is the same as spring valve 28 in Figs. 3 and 5, and this valve has a central part ball projection which closes a filler opening 32a of the male link end member 32.

The female link end member 37 is formed with a hole 37a, central to the socket 36, through which the shank of a coupling pin 39 extends, while an enlarged portion of the coupling pin 39 has a slidable fit in the hole 37a. The inner end of the coupling pin is formed with an integral circular flat head 39a, which provides a shoulder seat 39b, whose plane is in perpendicular to the center line of the coupling pin 39, and supports a replaceable bearing ring 40, which is formed with an external segmental spherical bearing surface to mate with the internal spherical bearing surface of the hollow stud 30 and two spiral lubrication grooves 40a and 40b and is formed with a central hole whose wall will not touch the reduced portion of the coupling pin 39 which will be displaced or has a free floating movement along the shoulder seat 39b imposed by a load on the link end members. The magnitude of this movement normally is very small. The coupling pin 39 is formed with an integral blade 39c, to stir the lubricant in the bore of the hollow stud and to circulate it through the lubrication grooves to reach bearing surfaces. An elastic shield or sleeve 41 is expanded in a groove 36b of the skirt 36a of the female link end member 37, and engages the external spherical bearing surface of the hollow stud 30. A nut 39d of the coupling pin 39 engages a compressible or deformable washer 42, in a circular groove 37b of the female link end member 37, to prevent leakage of lubricant and impose slight pressure on the meeting bearing surfaces and to eliminate noises between these two link end members, caused by vibration. In this construction (Fig. 6) the bearing ring 35 of the female link end member has a rotating and limited tilting movement on the hollow stud 30 of the male link end member, the bearing ring 40 has a limited tilting movement in the hollow stud 30 and the head 39a of the coupling pin has a rotating movement on the bearing ring 40. The load imposed on the link end members will induce a pure tensile stress in the shank of the coupling pin.

Figure 3:
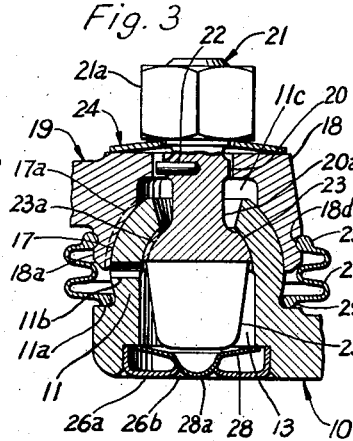
Fig. 3 is a cross-sectional view of a slightly modified form of the linkage joint of this invention.

The internal segmental spherical bearing surface of the socket 18 in Figs. 2 and 3 or the replaceable bearing ring 35 in Fig. 6 has one of its boundaries or edges at a diametral or equatorial circle for forming a bearing area to transmit a maximum possible force between the link end members.

In Figs. 7 and 8, I show an embodiment of the invention, which includes a male link end member 43 having a hollow stud 44 formed integral therewith. This male link end member 43 is shown to be right angular construction and is riveted or positively attached to a frame 43a by the fasteners or rivets 43b. The hollow stud 44 is formed with an external conical bearing surface 45, which is engaged by a mating internal conical bearing surface 46a of a socket 46 of a female link end member 47, which has a central hole 46b. This hollow stud is also formed with an internal circular end shoulder 48 which is engaged by a nut 49, through which the shank of a coupling pin 50 is threaded. The head 50a of this coupling pin engages a disc spring 51 which bears against the outer face of the female link end member 47. This female link end member is provided with a pin 47a, which is slidably interlocked with the nut 49 in a hole 49a, to prevent rotation of the nut in relation to the female link end member. To limit the inward movement of the nut 49 in assembling the coupling pin in the nut, a pin 44a is driven through the wall of the hollow stud 44. A cupped disc 52 has a pressed fit in a circular recess 43c formed in the male link end member 43, concentric with the bore of the hollow stud, to exclude dirt from the bore of the hollow stud and the bearing surfaces. The female link end member 47 is formed with an integral pair of arms 47b and a tubular shank 47c, which is internally threaded, and an externally threaded link rod 47d is threaded therein. The tubular shank 47c is provided with a deformable insert 47e to lock link rod 47d against accidental turning. An elastic insert 50b is provided in the threaded shank of the coupling pin 50 to prevent the accidental rotation of the coupling pin in the nut.

In Fig. 9, I show a modified form of the embodiment of the invention, comprising a male link end member 53 having an integral hollow stud 54 with an axial bore 54a which extends through. The hollow stud is formed with an external conical bearing surface 54b which is engaged by an internal conical bearing surface 55 of a socket 56a of a female link end member 56. A spiral lubrication groove 55a is formed on the bearing surface 55. The hollow stud is provided with an internal end shoulder 54c which is engaged by a nut 58, threaded on a coupling pin 59, which has a head 59a and an elastic insert 59b, and the coupling pin is extended through a central hole 56b of the female link end member 56 and the hollow stud 54 with a disc spring 57 disposed between the head 59a and the outer face of the female link end member. A pin 60 is driven through the end plate of the female link end member 56, in parallel with the coupling pin 59, and has a sliding fit in a hole 58a of the nut 58 to prevent relative rotative movement between the nut and the female link end member.

Figure 5:
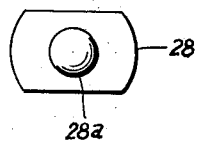
Fig. 5 is a detail bottom view of the spring valve as shown in Fig. 3.

The bore 54a of the hollow stud is used for reserving a supply of lubricant, and a flat fin or blade 61 is secured to the nut 58 by means of two small lugs 61a which are press fitted in mating holes 58b of the nut 58, as shown in Fig. 11, so that when the coupling pin and nut turn in normal rotating movement with the female link end member on the hollow stud of the male link end member, the lubricant will be stirred and caused to circulate. A cupped disc 62 has a pressed fit in the circular recess 53a of the male link end member 53, and is provided with a central filler opening 62a which is closed by a spring valve 63, which is the same as shown in Figs. 3 and 5. A protective sleeve 64 of elastic material is forced in a groove 56c on the skirt of the socket 56a of the female link end member 56 and the other end of the sleeve is pressed against an outer shoulder 53b of the male link end member to prevent loss of lubricant and to protect bearing surfaces. A lubrication hole or passage 54d is formed in the hollow stud 54 to lead the lubricant from the central reservoir to the engaged bearing surfaces.

In Fig. 10, I show another modified form of the embodiment of this invention, which includes a male link end member 65, having a circular socket 65a, which snugly receives the outer circular end of a hollow stud 66. A set screw 67 is threaded through the wall of the socket 65a to clamp the hollow stud in this socket. The end plate of the socket 65a is formed with a filler opening 65b which is normally closed by a spring valve 65c.

The hollow stud 66 is formed with an external conical bearing surface 66a, which is engaged by the internal conical bearing surface 68a of a bearing ring 68, having an external cylindrical shape, which is press fitted in a circular socket 69a of a female link end member 69 and is formed with a spiral lubrication groove 68b on its bearing surface. A lubrication hole or passage 66b is formed in the wall of the hollow stud to conduct the lubricant to the conical bearing surfaces of the bearing ring and the hollow stud and to the plane bearing surfaces.

A threaded coupling pin 70 extends centrally through a hole 69b of the socket 69a into the hollow stud and is engaged by a nut 71, which has a shoulder or a plane face to engage an internal end shoulder 66c of the hollow stud. A replaceable ring or washer 72 is disposed between the nut 71 and the end shoulder 66c. A head 70a of the coupling pin 70 engages a compressible or deformable washer 73, disposed in a circular recess 69c around the shank of the coupling pin. A pin 74, in parallel with the coupling pin 70, is driven through the end plate of the female link end member 69 and has a sliding engagement with a hole 71a in the nut 71 to prevent relative rotative movement between the nut and the female link end member. An elastic or deformable insert 70b is provided in the shank of the threaded coupling pin 70, shown in dotted lines in Fig. 10, to prevent the accidental rotation of the coupling pin in the nut. A lubricant circulating paddle or blade 75 is coupled to the nut 71 in the same manner as shown in Figs. 9 and 11 to agitate the lubricant in the bore of the hollow stud. An elastic protecting sleeve 76 is mounted in a groove 69c on the skirt of the socket 69a so that the sleeve skirt 76a will have pressure engagement with the external cylindrical surface of the hollow stud, to seal the joint against lubricant loss and to exclude dust getting into the linkage joint.

The shank of the coupling pin in the constructions shown in Figs. 8, 9, and 10 will be under a pure tensile stress by the load imposed on the link end members and the female link end member has a rotating movement only on the hollow stud of the male link end member.

In all of the constructions shown in the drawings on Sheets 1 and 2 an additional lubricant chamber is provided between the female link end member and the inner end of the hollow stud, for distributing lubricant over the engaged bearing surfaces.

In the constructions shown in Figs. 2, 3, and 6, a combination of rotative and limited tilting movement between the two link end members is permitted. In the constructions shown in Figs. 8, 9, and 10, a rotative movement only between the male and female link end members is allowed.

As shown in Figs. 2, 3, 6, 8, 9 and 10, the external and internal bearing surfaces of the hollow stud may be hardened or plated with a thin layer of hard material to increase the life of the linkage joint against wear. As shown in Figs. 2, 3, 8 and 9, the internal bearing surface of the socket of the female link end member and the bearing surface of the inner part of the coupling bolt may be plated or lined with a thin layer of relatively soft bearing material to improve wear quality and reduce the bearing friction of the linkage joint. As shown in Figs. 2, and 8, the internal bearing surface of the socket of the female link end member and the bearing surface of the inner part of the coupling bolt may be plated or lined with a thin layer of self-lubricating bearing material to improve wear quality, reduce bearing friction and eliminate the necessity of applying lubricant.

By use of the replaceable bearing rings as shown in Figs. 6 and 10 the life of the linkage joint may be prolonged by taking out old worn bearing rings and inserting fresh new bearing rings, which are comparatively soft but durable for wear, while the bearing surfaces on the hollow stud are hardened or plated wtih a thin layer of hard material. This always permits of the best selection of bearing materials for the replaceable bearing rings engaged with the hollow stud, and by making the hollow stud of material separate from that of the male link end members, as shown in Figs. 6 and 10, low costs and high grade working parts may be obtained.

In all cases, the outer part of the coupling bolt, either the nut as shown in Figs. 2, 3, and 6 or the head of the coupling pin as shown in Figs. 8, 9 and 10 is adjustable to maintain a specified clearance for the ultimate deflection of the disc spring or the elastic ring, when no load is applied on the link end members. A corresponding clearance will be formed between the engaged bearing surfaces, either spherically or concially shaped, when a load is applied on the link end members to deflect the disc spring or the elastic ring ultimately. The compression disc spring or the elastic ring is introduced for the purpose of maintaining physical contact of bearing surfaces, when there is no load applied on the link end members, to eliminate possible noise between the meeting parts caused by external vibration, or else.

From the above descriptions and the showing of the drawings, it will be understood that my invention provides a linkage joint in which the shank of the coupling bolt is under pure tensile stress which is induced by applying load on the link end members, because the coupling pin has a free floating movement in a plane perpendicular to its center line. My invention also provides in one form of construction limited tilting and rotation in a complete circle of 360 degrees or any part of it, and in the other form of construction only rotation in a complete circle of 360 degrees or any part of it.

It will be understood, of course, that various details of construction may be varied through a wide range without departing from the principles of this invention and it is, therefore, not the purpose to limit the patent granted hereon otherwise than necessitated by the scope of the appended claims.

Having fully described my invention, what I claim as new and desire to secure by Letters Patent is:

1. A linkage joint comprising a male link end member provided with a hole, a hollow stud formed on its one end with a hollow cylinder secured firmly in said hole and formed on the other end with an internal bearing surface, an external bearing surface and an end hole concentric to a common center line, a female link end member having means forming a socket which has an internal bearing surface in mating contact with the external bearing surface of said hollow stud, said female link end member having a hole central to its internal bearing surface, a coupling pin having a shank slidably fitted in the hole on said female link end member and passing through the end hole of said hollow stud, having an inner head inside said hollow stud and having an outer head outside of said female link end member, means to provide proper distance between the inner and the outer head of said coupling pin and to maintain the bearing contact between the internal bearing surface of said socket and the external bearing surface of said hollow stud, the inner head of said coupling pin having a plane ring-shaped bearing surface perpendicular to said shank, a bearing ring on the shank of said coupling pin having a plane bearing surface in bearing contact with the ring-shaped bearing surface of the inner head of said coupling pin and having another bearing surface matched with the internal bearing surface of said hollow stud, the inner head of said coupling pin having a free floating movement inside the hollow cylinder of said hollow stud along its plane ring-shaped bearing surface on said bearing ring, a compressible ring on said shank disposed between an outer face of said female link end member and the outer head of said coupling pin, said outer face having a limited displacement towards said outer head, and means for preventing relative rotative movement between said coupling pin and said female link end member, while permitting a relative movement between said female link end member and said hollow stud secured to said male link end member.

2. A linkage joint comprising a male link end member provided with a hole, a hollow stud formed on its one end with a hollow cylinder secured firmly in said hole and formed on the other end with an internal segmental spherical bearing surface, an external segmental spherical bearing surface concentric with said internal segmental spherical bearing surface about a common center and an end hole having outwardly tapering sides and having its center line passing said common center, a female link end member having means forming a socket which has an internal segmental spherical bearing surface in mating contact with the external segmental spherical bearing surface of said hollow stud, said female link end member having a hole central to its internal segmental spherical bearing surface, a coupling pin having a shank slidably fitted in the hole on said female link end member and passing through the end hole of said hollow stud and having an inner head with a plane ring-shaped bearing surface perpendicular to said shank, a nut threaded and locked on the shank of said coupling pin outside of said female link end member, a bearing ring on the shank of said coupling pin having a plane bearing surface in bearing contact with the ring-shaped bearing surface of the inner head of said coupling pin and having another external segmental spherical bearing surface matched with the internal segmental spherical bearing surface of said hollow stud, the inner head of said coupling pin having a free floating movement inside the hollow cylinder of said hollow stud along its plane ring-shaped bearing surface on said bearing ring, a compressible ring on said shank disposed between an outer face of said female link end member and said nut, said outer face having a limited displacement towards said nut and a key engaged between said shank and said female link end member to prevent relative rotative movement, while permitting a limited tilting movement and a rotative movement between said female link end member and said hollow stud secured to said male link end member, 3. A linkage joint set forth in claim 2 wherein said female link end member having an insert which has an internal segmental spherical bearing surface.

4. A linkage joint set forth in claim 2 wherein the internal segmental bearing surface of said socket having one of its boundaries at an equatorial circle.

5. A linkage joint set forth in claim 2 further comprising a cover securely engaged with the hollow cylinder of said hollow stud to form a lubricant reservoir and having a filler opening, a spring valve engaged with a shoulder in said hollow cylinder for closing the filler opening on said cover, a circulator on the inner head of said coupling pin inside the hollow cylinder of said hollow stud but slightly spaced away from said spring valve and a flexible seal having its one opening secured to a skirt of said female link and member and having its other opening slidably engaged with the external segmental spherical bearing surface of said hollow stud.

6. A linkage joint comprising a male link end member provided with a hole, a hollow stud formed on its one end with a hollow cylinder secured firmly in said hole and formed on the other end with an external conical bearing surface, smaller at its end, an internal plane ring-shaped bearing surface and an end hole concentric to a common center line, said internal plane ring-shaped bearing surface disposed at right angles to said common center line, a female link end member having means forming a socket which has an internal conical bearing surface in mating contact with the extenal conical bearing surface of said hollow stud, said female link end member having a hole central to its internal conical bearing surface, a coupling pin having a shank, slidably fitted with the hole on said female link end member, extending into said hollow stud through said end hole and having an outer head outside of an outer face of said female link end member, a nut threaded and locked on the shank of said coupling pin inside said hollow stud and having a shoulder, a bearing ring seated on the shoulder of said nut having a plane bearing surface in bearing contact with the internal ring-shaped bearing surface of said hollow stud, said nut having a free floating movement inside said hollow cylinder along the plane bearing surface of said bearing ring on said hollow stud, a compressible ring on said shank disposed between said otuer face and said outer head, said outer face having a limited displacement towards said outer head and a key in parallel with said shank engaged securely with said female link end member, passing the end hole of said hollow stud and slidably fitted in a hole on said nut, while permitting a rotative movement between said female link end member and said hollow stud secured in said male link end member.

7. A linkage joint set forth in claim 6 wherein said female link end member having an insert which has an internal conical bearing surface.

8. A linkage joint set forth in claim 6 further comprising a cover securely engaged with the hollow cylinder of said hollow stud to form a lubricant reservoir and having a filler opening, a spring valve engaged with a shoulder in said hollow cylinder for closing the filler opening on said cover, a circulator on said nut inside the hollow cylinder of said hollow stud but slightly spaced away from said spring valve and a flexible seal having its one opening secured to a skirt of said female link end member and having its other opening slidably engaged with an outer surface of the hollow cylinder of said hollow stud.

References Cited in the file of this patent
UNITED STATES PATENTS

| | | |
|---|---|---|
| 631,385 | Rowley | Aug. 22, 1899 |
| 1,320,775 | Mather | Nov. 4, 1919 |
| 1,470,201 | Spracklen | Oct. 9, 1923 |
| 2,211,817 | Hufferd et al. | Aug. 20, 1940 |
| 2,615,737 | Alldredge et al. | Oct. 28, 1952 |

U. S. DEPARTMENT OF COMMERCE
PATENT OFFICE

CERTIFICATE OF CORRECTION

Patent No. 2,828,984      Ho Chow      April 1, 1958

It is hereby certified that error appears in the printed specification of the above numbered patent requiring correction and that the said Letters Patent should read as corrected below.

Column 8, line 19, for "ring-shiped" read -- ring-shaped --; column 9, line 16, for "link and member" read -- link end member --; line 29, for "extenal" read -- external --; column 10, line 7, for "otuer" read -- outer --.

Signed and sealed this 3rd day of June 1958.

(SEAL)
Attest:

KARL H. AXLINE
Attesting Officer

ROBERT C. WATSON
Commissioner of Patents